(12) United States Patent
Funato et al.

(10) Patent No.: US 7,121,970 B2
(45) Date of Patent: Oct. 17, 2006

(54) CONTROL SYSTEM FOR A HYDRO-MECHANICAL TRANSMISSION

(75) Inventors: Masahiro Funato, Hirakata (JP); Toshikazu Okada, Osaka (JP); Shigeru Yamamoto, Hirakata (JP); Tomohiro Nakagawa, Hirakata (JP)

(73) Assignee: Komatsu Ltd., Tokyo (JP)

( * ) Notice: Subject to any disclaimer, the term of this patent is extended or adjusted under 35 U.S.C. 154(b) by 216 days.

(21) Appl. No.: 10/939,315

(22) Filed: Sep. 9, 2004

(65) Prior Publication Data
US 2005/0059521 A1 Mar. 17, 2005

(30) Foreign Application Priority Data
Sep. 16, 2003 (JP) ............................. 2003-322489
Aug. 16, 2004 (JP) ............................. 2004-236295

(51) Int. Cl.
*F16H 47/04* (2006.01)
(52) U.S. Cl. ............................. 475/78; 475/83; 60/489
(58) Field of Classification Search ................. 475/73, 475/78, 83, 72, 76; 60/468, 489
See application file for complete search history.

(56) References Cited

U.S. PATENT DOCUMENTS

| | | | |
|---|---|---|---|
| 3,640,066 A | * | 2/1972 | Marshall et al. .............. 60/466 |
| 3,650,107 A | * | 3/1972 | Court .......................... 60/443 |
| 4,102,425 A | * | 7/1978 | Marsden et al. ............. 180/242 |
| 4,192,199 A | * | 3/1980 | Hamma et al. ............... 475/83 |
| 4,368,653 A | | 1/1983 | Mizuno et al. |
| 4,939,900 A | * | 7/1990 | Furumoto et al. ........... 60/456 |
| 6,575,872 B1 | | 6/2003 | Gluck et al. |
| 6,761,658 B1 | * | 7/2004 | Stettler, Jr. .................. 475/73 |

FOREIGN PATENT DOCUMENTS

JP        2004-11769 A       1/2004

\* cited by examiner

*Primary Examiner*—Charles A. Marmor
*Assistant Examiner*—Justin K. Holmes
(74) *Attorney, Agent, or Firm*—Frishauf, Holtz, Goodman & Chick, P.C.

(57) ABSTRACT

A variable relief valve is inserted in a hydraulic piping for connecting a first pump/motor to a second pump/motor. The variable relief valve is controlled such that when shifting the transmission from forward to reverse or vice versa, a relief set pressure of the variable relief valve is reduced in response to switching of a forward/reverse shifting clutch mechanism and after completion of the switching of the forward/reverse shifting clutch mechanism, the relief set value is increased.

8 Claims, 7 Drawing Sheets

CONTROL SYSTEM FOR A HYDRO-MECHANICAL TRANSMISSION

TECHNICAL FIELD

The present invention relates to a control system for a hydro-mechanical transmission designed to transmit power from the input shaft to the output shaft through a mechanical transmission unit and a hydrostatic transmission unit.

BACKGROUND ART

There have been known hydro-mechanical (power split type) transmissions (HMTs) which hydraulically transmit part of input power while mechanically transmitting the remaining part of it. Since mechanical power is transmitted with high efficiency, hydro-mechanical transmissions (HMTs) are designed to convert only part of mechanical power into hydraulic power, so that they can achieve high transmission efficiency. By virtue of this, they are considered to be ideal transmissions for vehicles subjected to wide load variations such as bulldozers and wheel loaders and some of them are, in fact, employed in such vehicles.

In a typical hydro-mechanical transmission (HMT), variable speed characteristics are achieved by a planetary gear train. More concretely, the following arrangement is employed. Of three elements of the planetary gear train (i.e., the sun gear, the carrier provided with planetary gears, and the ring gear), a first element is coupled to the input shaft, a second element is coupled to the output shaft, and a third element is coupled to a hydraulic pump or hydraulic motor. The rotational speed of the hydraulic pump or hydraulic motor is varied thereby changing the rotational speed of the output shaft.

In the known art, there are basically two types of HMTs. One is an "output-split type" where a hydraulic pump or hydraulic motor, which is connected by means of a hydraulic circuit to another hydraulic pump or hydraulic motor coupled to the planetary gear train, is coupled to the input shaft of the transmission so as to obtain a constant speed ratio. The other is an "input-split type" where a hydraulic pump or hydraulic motor, which is connected by means of a hydraulic circuit to another hydraulic pump or hydraulic motor coupled to the planetary gear train, is coupled to the output shaft of the transmission so as to obtain a constant speed ratio. Further, the output-split type and input-split type are respectively classified into six types according to which of the three elements of the planetary gear train is coupled to the hydraulic pump, hydraulic motor or input/output shafts and, in total, 12 types are available as basic combinations.

The conventional output-split type HMT and input-split type HMT will be respectively described in more detail.

Figure 5:
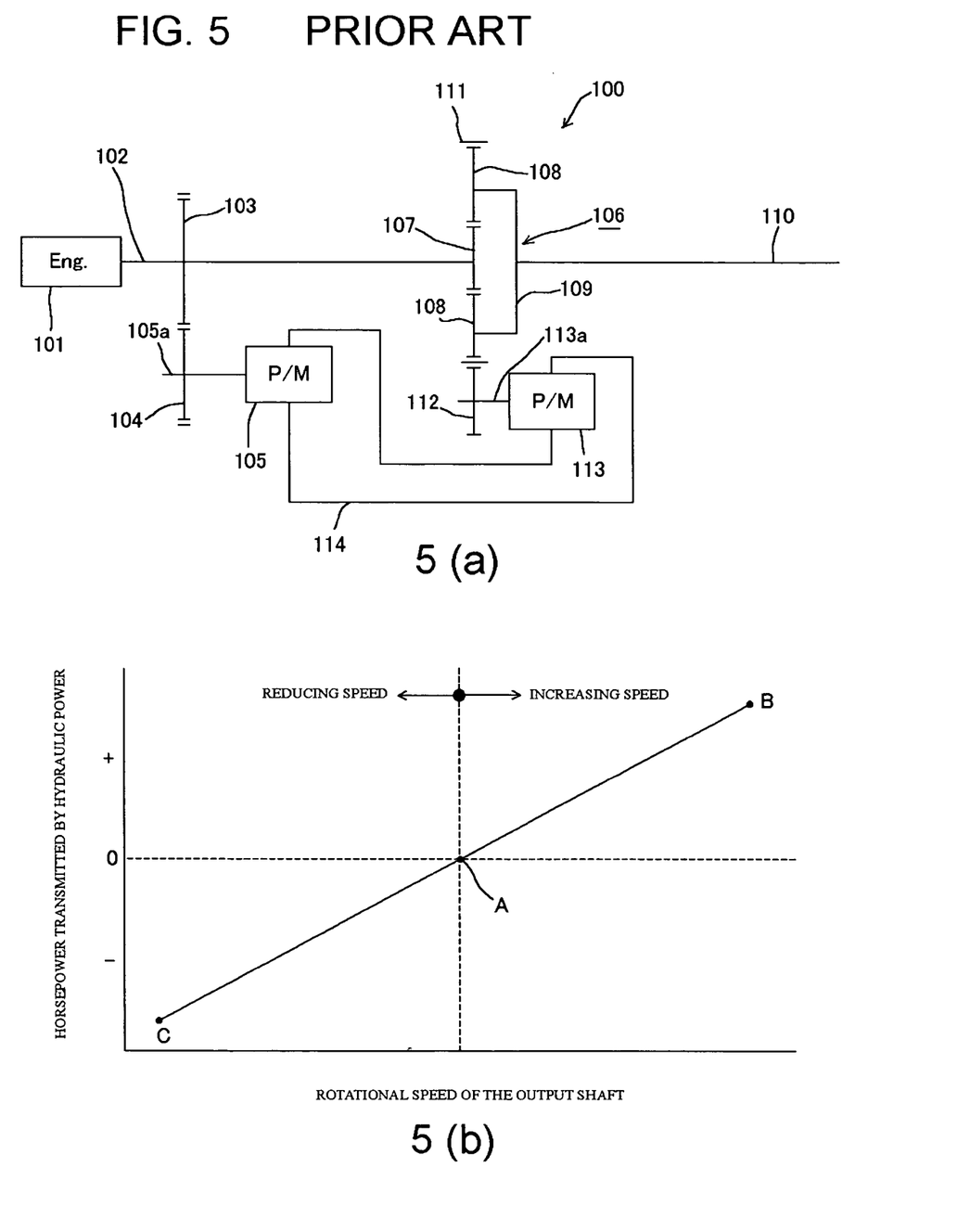
FIGS. 5(a), 5(b) are a schematic structural diagram and transmitted horsepower characteristic diagram, respectively, of a prior art output-split type HMT having two pump/motors.

FIG. 5(a) shows a schematic structural diagram of an output-split type HMT. In this output-split type HMT 100, a first gear 103 is secured to an input shaft 102 to which power from an engine 101 is input. A second gear 104 meshing with the first gear 103 is secured to a shaft 105a of a first pump/motor 105. Secured to the input shaft 102 is a sun gear 107 of a planetary gear train 106. A plurality of planetary gears 108 are disposed so as to mesh with the periphery of the sun gear 107. Each planetary gear 108 is axially supported by a planetary carrier 109 to which an output shaft 110 is secured. A ring gear 111 meshes with the periphery of the planetary gear set 108. Meshing with the periphery of the ring gear 111 is a third gear 112 which is secured to a shaft 113a of a second pump/motor 113. In this arrangement, the first pump/motor 105 is hydraulically connected to the second pump/motor 113 by a piping 114.

In such a system, when the rotational speed of the second pump/motor 113, that is, the rotational speed of the ring gear 111 is zero, hydraulically transmitted power becomes zero so that all power is transmitted through the mechanical unit. On the basis of the rotational speed of the output shaft 110 at that time, the operation of this system will be described.

(1) When increasing the rotational speed of the output shaft 110, the second pump/motor 113 receives motive power through the medium of hydraulic pressure and is activated to increase the rotational speed of the output shaft 110. At that time, the first pump/motor 105 serves as a pump whereas the second pump/motor 113 serves as a motor, so that energy is transmitted from the first pump/motor 105 to the second pump/motor 113 through the medium of hydraulic pressure. Then, the horsepower transmitted by hydraulic power becomes plus (+) as indicated by line A-B in FIG. 5(b) and the hydraulic power flows in a forward direction, i.e., from the input shaft 102 toward the planetary gear train 106.

(2) When reducing the rotational speed of the output shaft 110, the second pump/motor 113 receives motive power from the planetary gear train 106 and rotates in a direction opposite to that of the case (1). At that time, the second pump/motor 113 serves as a pump whereas the first pump/motor 105 serves as a motor, so that energy is transmitted from the second pump/motor 113 to the first pump/motor 105 through the medium of hydraulic pressure. Then, the horsepower transmitted by hydraulic power becomes minus (−) as indicated by line A-C in FIG. 5(b) and the hydraulic power flows in a reverse direction, i.e., from the planetary gear train 106 toward the input shaft 102.

Figure 6:
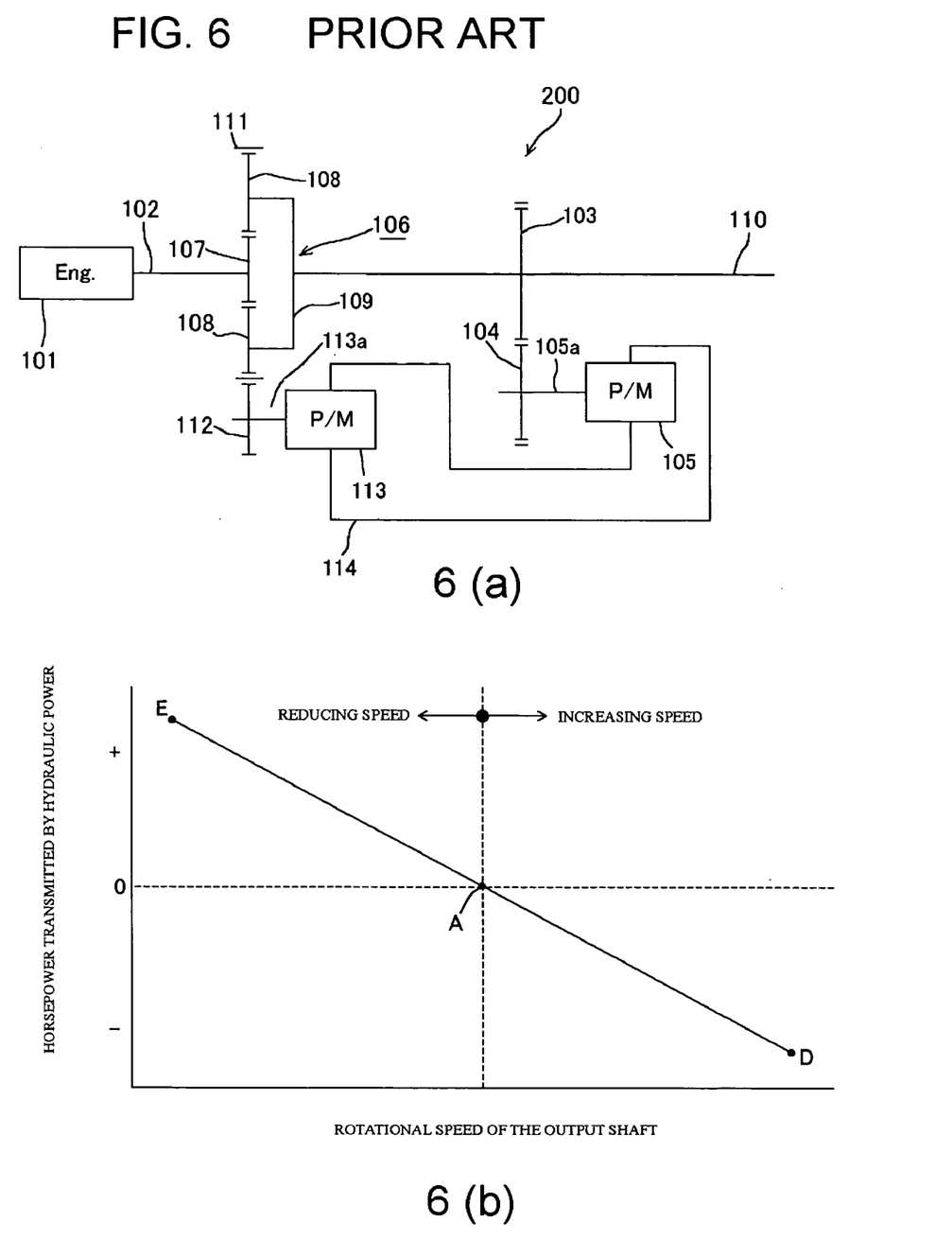
FIGS. 6(a), 6(b) are a schematic structural diagram and transmitted horsepower characteristic diagram, respectively, of a prior art input-split type HMT having two pump/motors.

FIG. 6(a) shows an input-split type HMT 200 in which the planetary gear train 106 is disposed on the side of the input shaft 102 whereas the first pump/motor 105 is disposed on the side of the output shaft 110. In FIG. 6(a), the parts that are substantially equivalent or function substantially similarly to those of the transmission 100 shown in FIG. 5(a) are indicated by the same numerals as in FIG. 5(a), and a detailed explanation of them is skipped herein.

The input-split type transmission 200 is constructed as follows.

(1) When increasing the rotational speed of the output shaft 110, the second pump/motor 113 serves as a motor while the first pump/motor 105 serves as a pump, so that energy is transmitted from the first pump/motor 105 to the second pump/motor 113 through the medium of hydraulic pressure. Then, the horsepower transmitted by hydraulic power becomes minus (−) as indicated by line A-D in FIG. 6(b) and the hydraulic power flows in a reverse direction, i.e., from the output shaft 110 toward the planetary gear train 106.

(2) When reducing the rotational speed of the output shaft 110, the second pump/motor 113 receives motive power from the planetary gear train 106 and rotates in a direction opposite to that of the case (1). At that time, the second pump/motor 113 serves as a pump whereas the first pump/motor 105 serves as a motor, so that energy is transmitted from the second pump/motor 113 to the first pump/motor 105 through the medium of hydraulic pressure. Then, the horsepower transmitted by hydraulic power becomes plus (+) as indicated by line A-E in FIG. 6(b) and the hydraulic power flows in a forward direction, i.e., from the planetary gear train 106 toward the output shaft 110.

As such, in both output-split type and input-split type transmissions, energy flows in forward and reverse directions occur in the speed increasing region and the speed reducing region. The transmission efficiency of energy in this case will be hereinafter examined, taking the output-split type HMT 100 shown in FIG. 5 for example. Herein, the transmission efficiency of the mechanical unit is 95% and the transmission efficiency of the hydrostatic unit is 80% (Generally, where pump-motors are used, transmission efficiency is low). For easy comparison, assume that the amount of engine power is 1.0 and one third the engine power is input to the hydrostatic unit.

Figure 7:
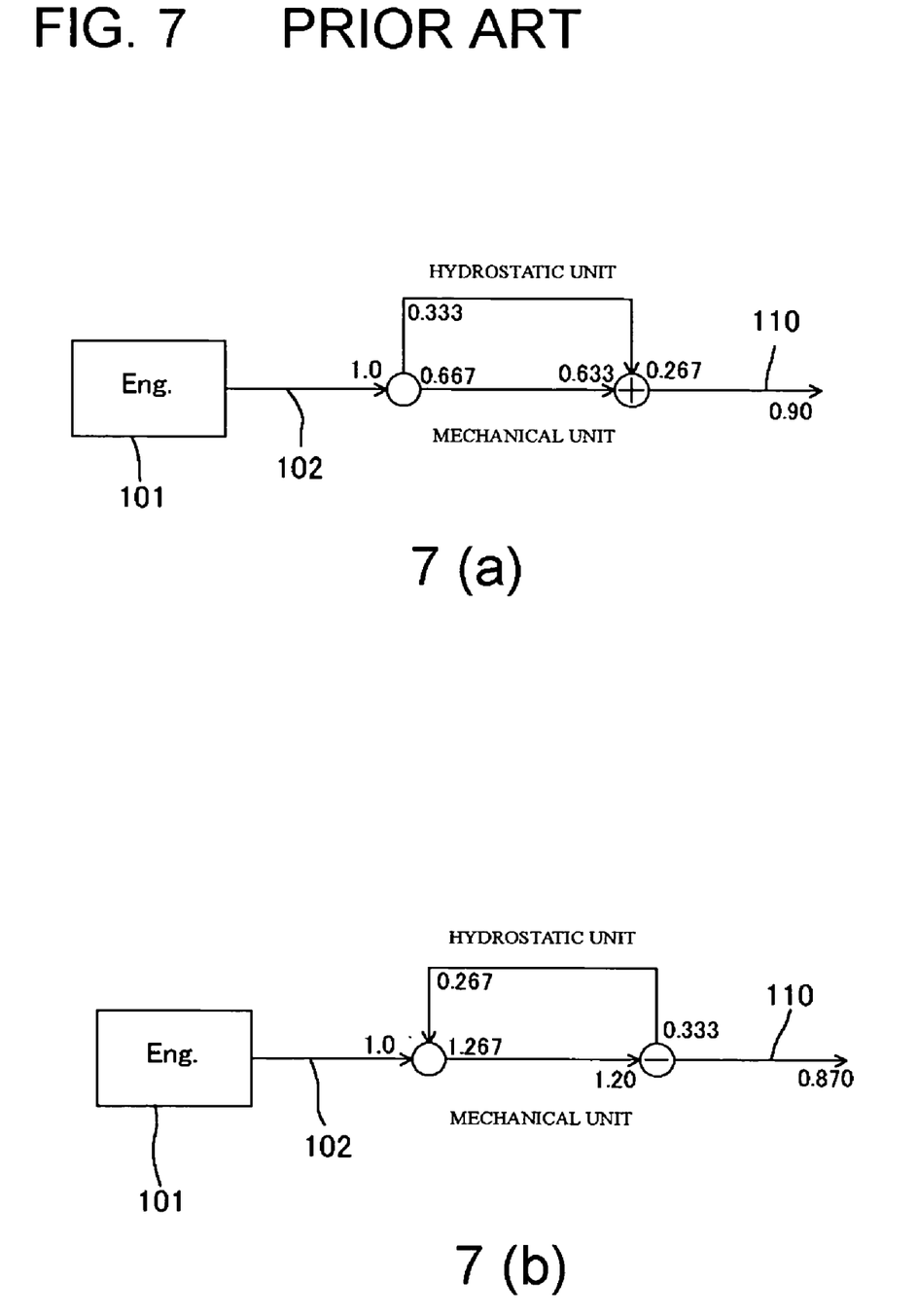

FIG. 7(*a*) shows the case where hydraulic power flows in the forward direction. Specifically, one third (0.333 part) the energy output from the engine 101 flows to the hydrostatic unit for increasing speed. Transmitted to the output shaft 110 are 0.633 (=(1−⅓)×0.95) part of energy from the mechanical unit and 0.267 (=0.333×0.8) part of energy from the hydrostatic unit. As a result, the overall efficiency becomes 0.9 (=0.633+0.267). The case where hydraulic power flows in the reverse direction is shown in FIG. 7(*b*). In this case, 1.267 (=1+0.267) parts of energy are input to the mechanical unit and 1.20 (=1.267×0.95) parts of energy are transmitted, so that the overall efficiency is 0.870 (=1.20−0.333).

As just described, when hydraulic power flows in the reverse direction, a large flow of energy occurs in each element, resulting in poor efficiency. In other words, a forward flow of hydraulic energy is better than a reverse flow of hydraulic energy. As seen from FIGS. 7(*a*) and 7(*b*), if part of energy flows in the reverse direction, the energy that pass through the mechanical unit will increase, and therefore, there arises a need to increase the size of the planetary gear train, which leads to a disadvantage in economical efficiency.

As an attempt to solve the problems of the prior art output-split type HMT and input-split type HMT, there has been proposed a transmission capable of serving as an output-split type HMT when the rotational speed of the output shaft is increased and as an input-split type HMT when the rotational speed of the output shaft is reduced. This proposed transmission has several advantages: the horsepower transmitted by hydraulic power can be kept to be plus irrespective of the rotational speed of the output shaft, so that hydraulic power can be allowed to constantly flow in the forward direction and increased energy efficiency can be achieved in all speed zones including the low speed zone to high speed zone.

In a vehicle having the above transmission capable of selectively functioning as an output-split HMT or as an input-split HMT, when the transmission is shifted from forward to reverse or vise versa, the following operation is usually carried out: After disengagement of the forward (or reverse) clutch, the reverse (or forward) clutch is allowed to slide, so that the movement of the vehicle is changed from forward (or reverse) to reverse (or forward) and the reverse (or forward) clutch is engaged.

However, such sliding engagement of the forward or reverse clutch during operation for shifting the transmission of the vehicle between forward and reverse causes higher load and heat load on the forward and reverse clutches, with higher vehicle speed before initiating the gear shifting operation. As a result, it becomes necessary to increase the capacity of the clutches.

The invention is directed to overcoming the foregoing shortcomings and a primary object of the invention is to provide a control system for a hydro-mechanical transmission which selectively functions as an output-split type HMT or as an input-split type HMT, the control system being capable of reducing the load imposed on the forward and reverse clutches during gear shifting between forward and reverse.

SUMMARY OF THE INVENTION

The above object can be accomplished by a control system for a hydro-mechanical transmission according to the invention, the hydro-mechanical transmission having (a) an input shaft, (b) an output shaft, (c) a mechanical transmission unit including a planetary gear train interposed between the input shaft and the output shaft, (d) a hydrostatic transmission unit including a first pump/motor, a second pump/motor and a hydraulic piping for connecting the first and second pump/motors, (e) a coupling/decoupling clutch mechanism for selectively coupling the first pump/motor to either the input shaft or the output shaft, and (f) a forward/reverse shifting clutch mechanism disposed at one end of the output shaft, the hydro-mechanical transmission being formed such that the input shaft is coupled to a first element of the planetary gear train; the second pump/motor is coupled to a second element of the planetary gear train; and the output shaft is coupled to a third element of the planetary gear train, the control system comprising: (a) a variable relief valve inserted in the hydraulic piping for connecting the first pump/motor to the second pump/motor; and (b) a variable relief valve controlling means for controlling the variable relief valve such that a relief set pressure of the variable relief valve is reduced in response to switching of the forward/reverse shifting clutch mechanism when shifting the transmission from forward to reverse or vice versa and such that the relief set pressure is increased after completion of the switching of the forward/reverse shifting clutch mechanism.

According to the invention, when the rotational speed of the output shaft is increased, the first pump/motor is coupled to the input shaft by the coupling/decoupling clutch mechanism so that the transmission serves as an output-split type HMT. On the other hand, when the rotational speed of the output shaft is decreased, the first pump/motor is coupled to the output shaft by the coupling/decoupling clutch mechanism so that the transmission serves as an input-split type HMT. As a result, hydraulic power can be allowed to constantly flow in a forward direction. In such a transmission which selectively functions as an output-split type HMT or as an input-split type HMT, when initiating operation for shifting the transmission of the vehicle from forward to reverse or vice versa, a relief set pressure of the variable relief valve inserted in the hydraulic piping for connecting the first pump/motor to the second pump/motor is reduced in response to switching of the forward/reverse (F/R) shifting clutch mechanism, and after completion of the switching of the F/R shifting clutch mechanism, the relief set pressure is increased. Thus, pressure oil within the hydraulic piping for connecting the first pump/motor to the second pump/motor is drained when the F/R shifting clutch mechanism is switched, so that it becomes unnecessary to carry out gear shifting by sliding engagement of the forward or reverse clutch of the F/R shifting clutch mechanism and gear shifting can be carried out by hydraulic control of the hydraulic piping alone. In consequence, the load and heat load imposed on the forward and reverse clutches can be reduced and therefore the capacity of the forward and reverse clutches can be reduced.

BRIEF DESCRIPTION OF THE DRAWINGS

FIGS. (7a) and 7(b) are explanatory diagrams illustrating the difference in efficiency between different energy flows according to the prior art.

DETAILED DESCRIPTION OF THE INVENTION

Referring now to the accompanying drawings, a control system for a hydro-mechanical transmission will be concretely described according to one preferred embodiment of the invention.

Figure 1:
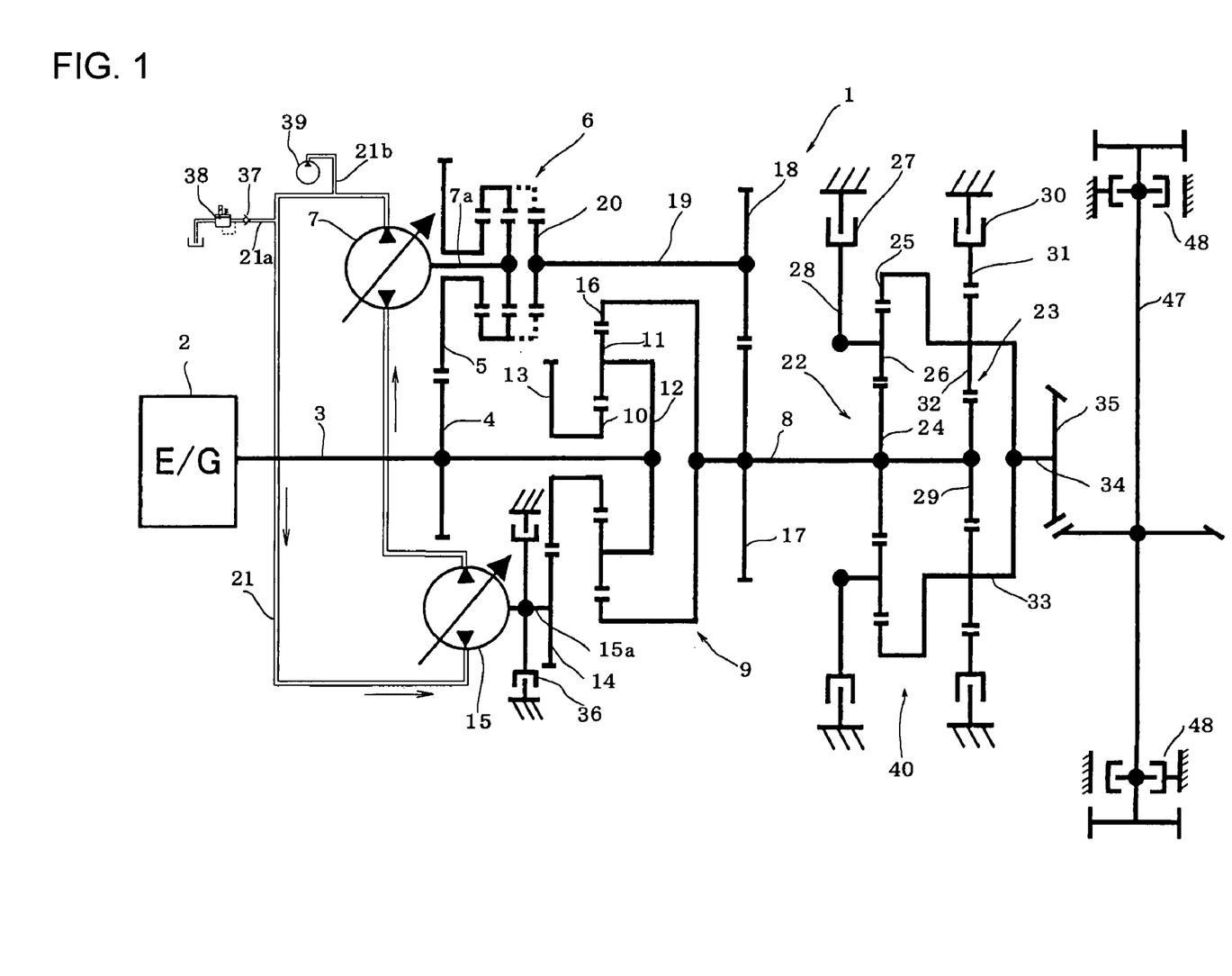
FIG. 1 is a schematic structural diagram of a hydro-mechanical transmission constructed according to an embodiment of the invention.

FIG. 1 is a schematic structural diagram of a control system for a hydro-mechanical transmission constructed according to an embodiment of the invention. While the invention is applied to a transmission for a track-type vehicle such as bulldozers in this embodiment, it is obvious that the invention is not limited to this application.

In a hydro-mechanical transmission 1 constructed according to this embodiment, a first gear 4 is secured to an input shaft 3 to which power from an engine 2 is input. A second gear 5 meshes with the first gear 4 such that it can be coupled to a shaft 7a of a first pump/motor 7 through an coupling/decoupling clutch mechanism (hereinafter referred to as "clutch mechanism") 6 such as a synchromesh mechanism. The clutch mechanism 6 is situated between the second gear 5 and a seventh gear 20 (described later), and upon switching of the clutch mechanism 6, the rotation of the shaft 7a is selectively brought into synchronization with the rotation of the second gear 5 or the rotation of the seventh gear 20.

Disposed between the input shaft 3 and an intermediate output shaft 8 which are aligned on the same axis line is a planetary gear train 9 for gear shifting, the planetary gear train 9 serving as a mechanical transmission unit. On the input shaft 3, a sun gear 10 of the gear-shifting planetary gear train 9 is rotatably supported and a planetary carrier 12 for axially supporting a plurality of planetary gears 11 is secured. A third gear 13 having large diameter is integrally coupled to the sun gear 10. A fourth gear 14 meshes with the periphery of the third gear 13 and is secured to a shaft 15a of a second pump/motor 15. A ring gear 16 meshes with the periphery of the planetary gear set 11. Secured to the ring gear 16 is the intermediate output shaft 8. Secured to the intermediate output shaft 8 is a fifth gear 17 with which a sixth gear 18 meshes. The sixth gear 18 is in turn secured to the seventh gear 20 through a shaft 19. The seventh gear 20 is rotatably supported by the shaft 7a of the first pump/motor 7. The first pump/motor 7 and the second pump/motor 15 are connected to each other through a hydraulic piping 21.

Disposed behind the intermediate output shaft 8 is a forward/reverse (F/R) shifting clutch mechanism 40 having a single planetary type reverse planetary gear train 22 and forward planetary gear train 23. The reverse planetary gear train 22 is composed of a sun gear 24 secured to the intermediate output shaft 8; a ring gear 25 located outside the sun gear 24; a planetary gear 26 located between the gears 24, 25 so as to mesh therewith; and a planetary carrier 28 for the planetary gear 26, that can be hydraulically braked by a reverse hydraulic clutch 27. The forward planetary gear train 23 is composed of a sun gear 29 secured to the intermediate output shaft 8; a ring gear 31 that is located outside the sun gear 29 and can be hydraulically braked by a forward hydraulic clutch 30; a planetary gear 32 located between the gears 29, 31 so as to mesh therewith; and a planetary carrier 33 for the planetary gear 32, that is integrally secured to the ring gear 25 of the reverse planetary gear train 22.

The planetary carrier 33 is coupled to the output shaft 34 which is in turn coupled to a hydraulically-steering type steering unit (not shown) disposed on a transverse shaft 47 through a bevel gear 35. The steering unit is coupled to right and left final reduction gears. Power transmitted from the output shaft 34 to the transverse shaft 47 is then transmitted to right and left sprockets for driving right and left crawler belts respectively through the steering unit, the final reduction gears and others. The transverse shaft 47 is provided with a vehicle body brake mechanism 48.

Although the rotation of the second pump/motor 15 stops when shifting the shaft 7a of the first pump/motor 7 to the second gear 5 side or the seventh gear 20 side by the clutch mechanism 6, the shaft 15a of the second pump/motor 15 is provided with a brake mechanism (lock clutch) 36 for braking the rotation of the shaft 15a, in order to stop it without fail. Connected to the hydraulic piping 21 for connecting the first pump/motor 7 to the second pump/motor 15 are a first branch piping 21a and a second branch piping 21b. A return check valve 37 and a variable relief valve 38 are inserted in the first branch piping 21a and the second branch piping 21b is connected to a charge pump 39.

Figure 2:
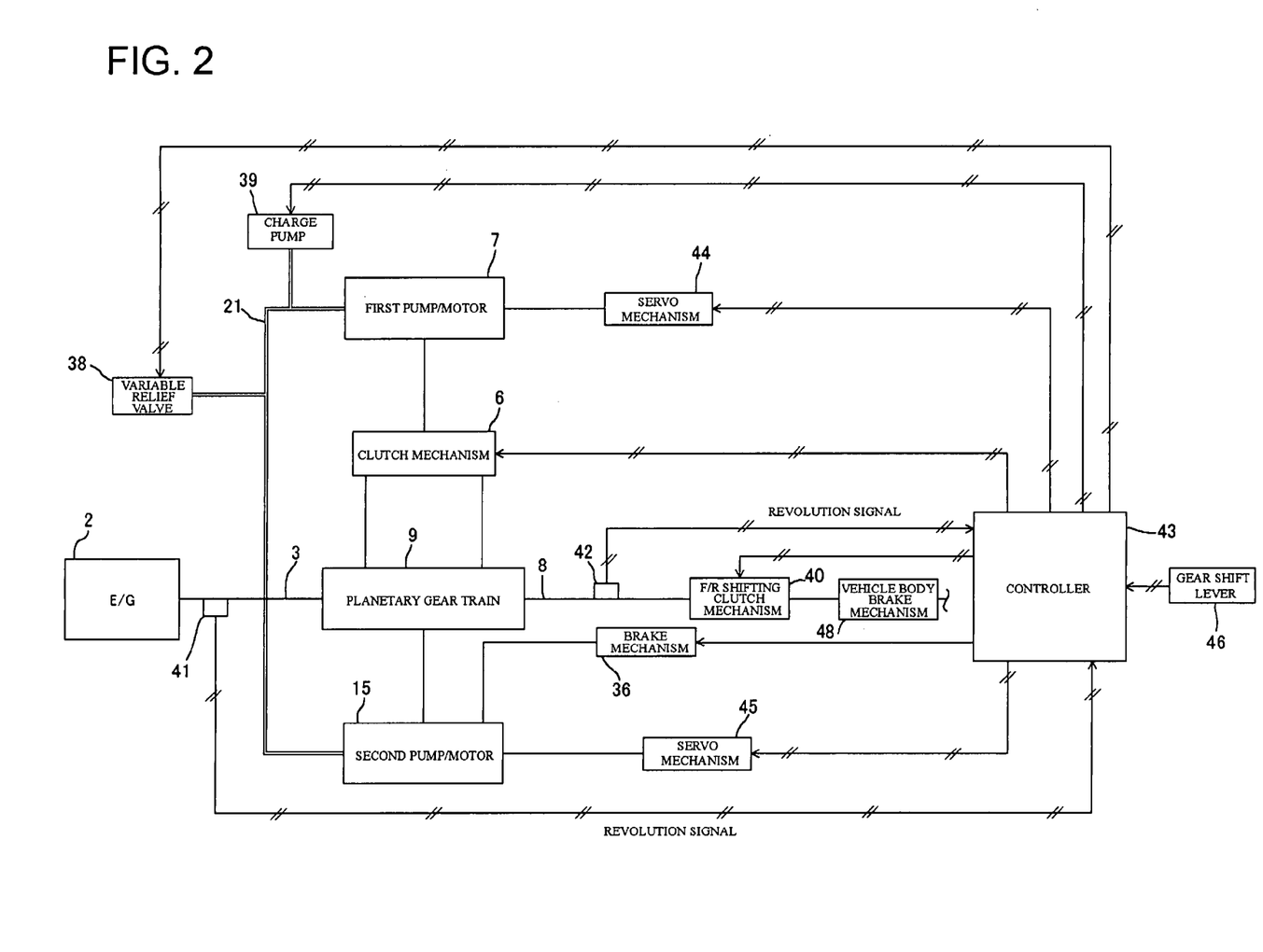
FIG. 2 is a control block diagram of the hydro-mechanical transmission according to the embodiment.

FIG. 2 shows a control block diagram of the hydro-mechanical transmission of the present embodiment. In this control block diagram, the input shaft 3 of the transmission, that is, the output shaft of the engine 2 is provided with an engine speed sensor 41 for detecting the revolutions of the input shaft 3, whereas the intermediate output shaft 8, that is, the output shaft of the planetary gear train 9 is provided with a transmission output shaft revolution sensor 42 for detecting the revolutions of the output shaft of the planetary gear train 9. Detection signals from these sensors 41, 42 are input to a controller 43. Also, an F/R change signal from a gear shift lever (F/R change lever) 46 for changing the movement of the vehicle to forward or reverse is input to the controller 43.

Although not shown in the drawings, the controller 43 is composed of a central processing unit (CPU) for executing a specified program; a read only memory (ROM) for storing this program and various tables; and a writable memory serving as a working memory necessary for execution of the program. In response to input signals such as the engine speed signal from the sensor 41 and the transmission output shaft revolution signal from the sensor 42 and the F/R change signal from the gear shift lever 46, the controller 43 performs arithmetic operations through execution of the program to send an angle control signal to a servo mechanism 44 for controlling the swash plate angle of the first variable displacement type pump/motor 7 and to a servo mechanism 45 for controlling the swash plate angle of the second variable displacement type pump/motor 15; to send an actuation signal to the F/R shifting clutch mechanism 40; to send a switch-over signal to the clutch mechanism 6; to send a brake pressure setting signal to the brake mechanism 36; to send a brake pressure setting signal to the vehicle body brake mechanism 48; to send a relief pressure setting signal to the variable relief valve 38; and to send a drive/stop signal to the charge pump 39.

Figure 3:
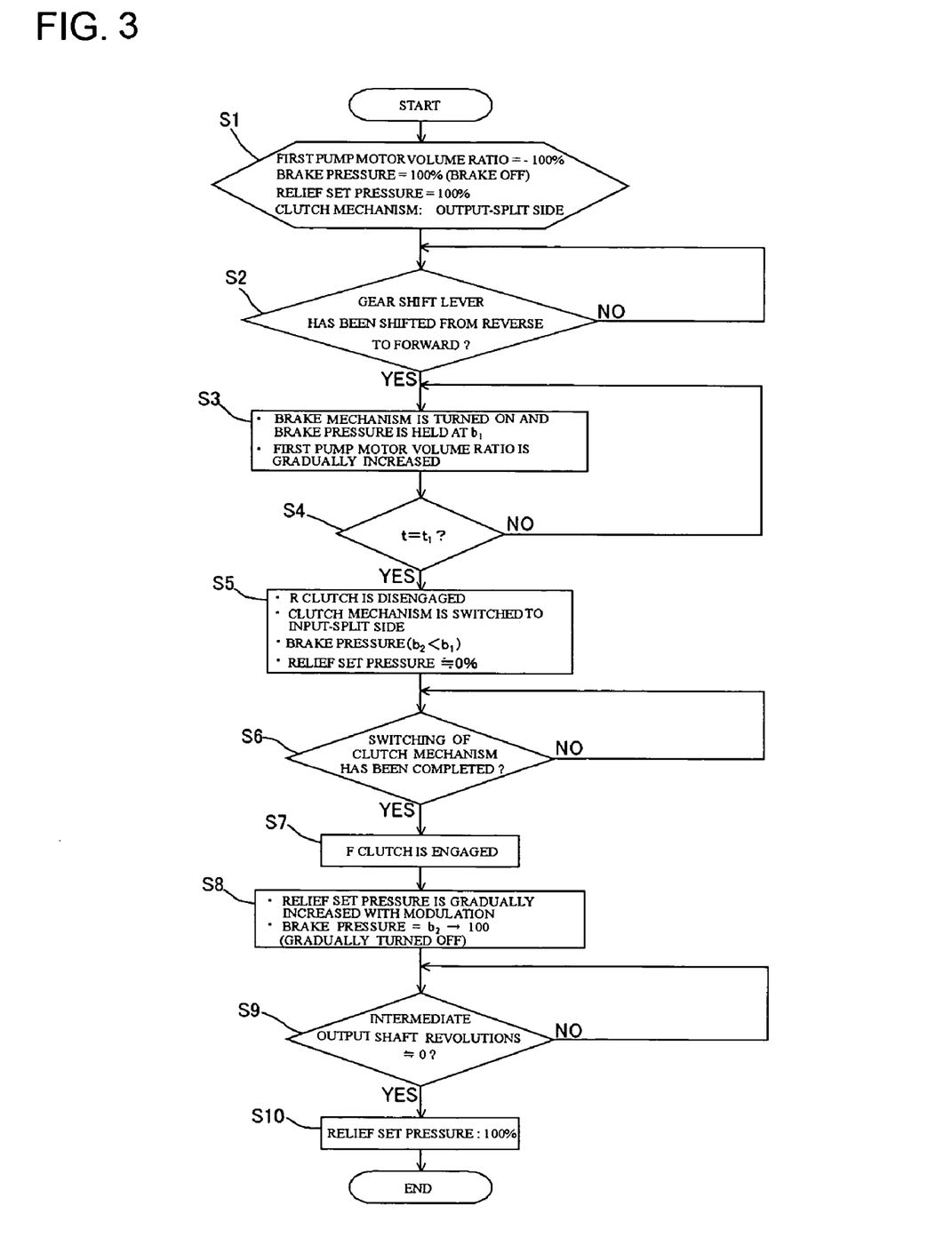
FIG. 3 is a flow chart of gear shifting control from reverse to forward.
Figure 4:
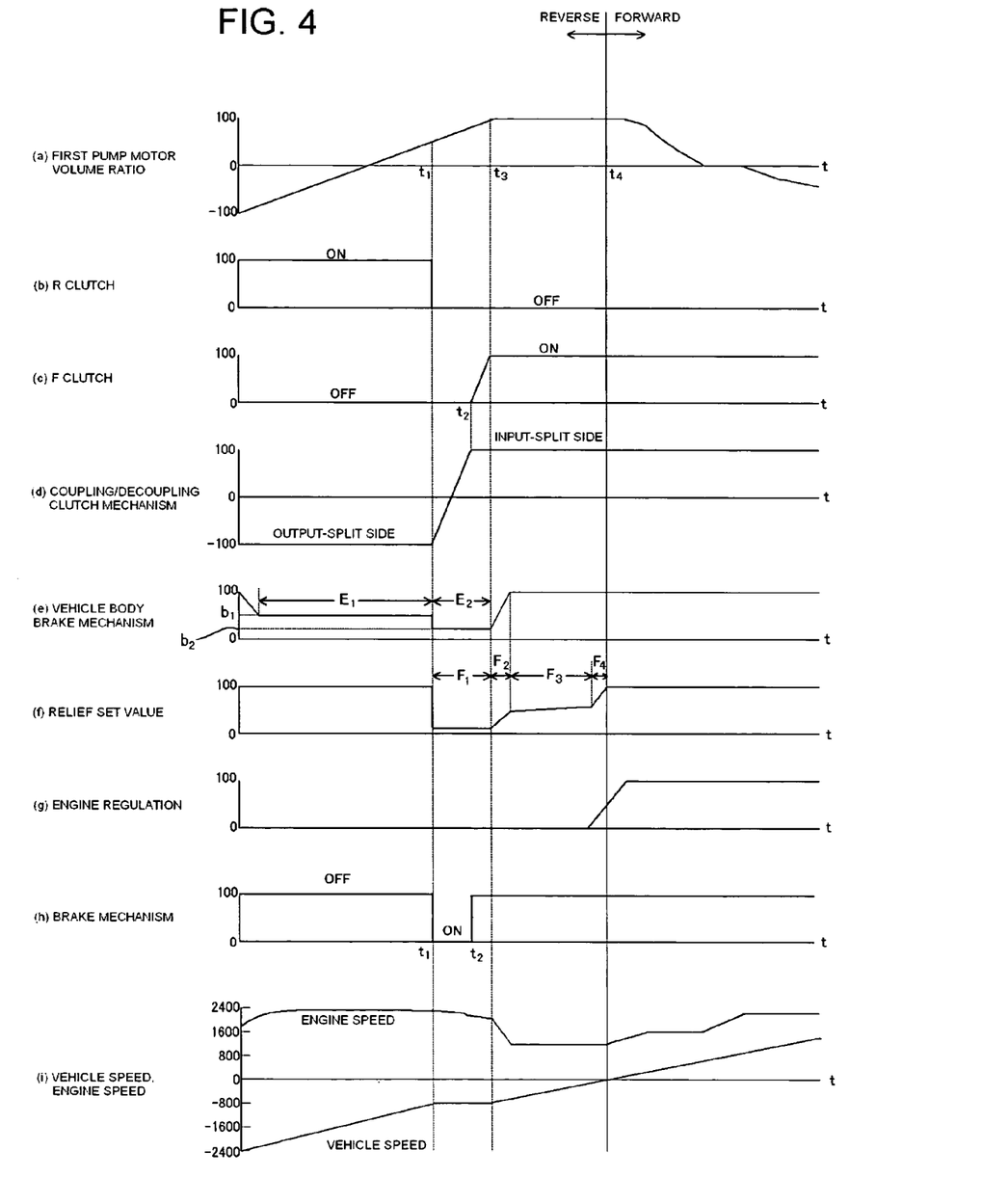
FIG. 4 is a time chart of the gear shifting control from reverse to forward.

Next, reference is made to the flow chart of FIG. 3 in conjunction with the time chart of FIG. 4 to describe one embodiment of gear shift control operation by way of an example where the movement of the vehicle is changed to forward when the vehicle is moving at relatively high speed in a reverse direction.

Step S1: In an initial state, the volume ratio of the first pump/motor 7 is −100% (FIG. 4(a)), the brake pressure of the vehicle body brake mechanism 48 is 100% (brake-OFF state) (FIG. 4(e)), the relief set pressure of the variable relief valve 38 is at its maximum value (100%) so that pressure oil does not leak from the hydraulic piping 21 (FIG. 4(f)), and the clutch mechanism 6 is positioned at its output-split side (where the shaft 7a of the first pump/motor 7 is coupled to the second gear 5) (FIG. 4(d)). Further, in this initial state, the reverse hydraulic clutch (R clutch) 27 is in its ON state (FIG. 4(b)) whereas the forward hydraulic clutch (F clutch) 30 is in its OFF state (See FIG. 4(c)).

Step S2 to S3: When the transmission is in the above-described initial state and t=0, if the gear shift lever 46 is shifted from reverse to forward so that an F/R change signal is input to the controller 43, the volume ratio of the first pump/motor 7 is gradually increased from this state for changing the speed ratio (FIG. 4(a)), and the vehicle body brake mechanism 48 is operated in its ON direction to hold the brake pressure at b1 (FIG. 4(e)). As a result, vehicle speed gradually drops (FIG. (i)). It should be noted that the holding zone $E_1$ for the brake pressure $b_1$ of the vehicle body brake mechanism 48 in FIG. 4(e) is provided for the purpose of shortening the time required for gear shifting by dropping vehicle speed.

Step S4 to S5: A check is made to determine whether time $t_1$ (e.g., 0.5 sec) has elapsed after operating the gear shift lever. If it is determined that time $t_1$ has elapsed, the reverse hydraulic clutch 27 is then disengaged (FIG. 4(b)), and at the same time, the brake mechanism 36 is operated in its ON direction (FIG. 4(h)) while initiating operation for shifting the clutch mechanism 6 from the output-split side to the input-split side (where the shaft 7a of the first pump/motor 7 is coupled to the seventh gear 20) (FIG. 4(d)). Then, the vehicle body brake mechanism 48 is further operated in the ON direction to hold the brake pressure at $b_2$ (FIG. 4(e)). The relief set pressure of the variable relief valve 38 is decreased to the vicinity of zero, whereby pressure oil is drained from the hydraulic piping 21 through the branch piping 21a (see the control zone $F_1$ in FIG. 4(f)). In FIG. 4(e), the holding zone $E_2$ for the brake pressure $b_2$ of the vehicle body brake mechanism 48 is provided for the purpose of mitigating a gear shift shock caused by the operation for bringing both the reverse hydraulic clutch 27 and the forward hydraulic clutch 30 into their OFF state in the relief set pressure controlling zone $F_1$.

Step S6 to S7: It is determined whether the clutch mechanism 6 has been switched to the input-split side within the relief set pressure controlling zone $F_1$. Almost as soon as the switching of the clutch mechanism 6 ($t=t_2$) has been completed, the brake mechanism 36 is operated in its OFF direction (FIG. 4(h)) and engagement of the forward hydraulic clutch 30 is initiated (FIG. 4(c)).

Step S8: Upon completion of the engagement of the forward hydraulic clutch 30 when time $t=t_3$ (FIG. 4(c)), the vehicle body brake mechanism 48 is gradually returned in its OFF direction until the brake pressure becomes 100% (FIG. 4(e)), while gradually returning the relief set pressure of the variable relief valve 38 to OFF position with modulation (See the controlling zones $F_2$, $F_3$ and $F_4$ in FIG. 4(f)) to send pressure oil from the charge pump 39 to the hydraulic piping 21 through the branch piping 21b to replenish the hydraulic piping 21 with it. By thus imparting modulation to the relief set pressure of the variable relief valve 38, the hydraulic pressure within the hydraulic piping 21 is allowed to gradually increase after completion of switching the F/R shifting clutch mechanism 40, so that a gear change shock can be mitigated.

Steps S9 to S10: After it is detected from the input signal received from the transmission output shaft revolution sensor 42 that the revolutions of the intermediate output shaft 8 have become approximately zero (a specified minus value in the vicinity of zero), the relief set pressure is returned to its maximum value (100%). In this way, switching of the F/R shifting clutch mechanism 40 is completed with a minimized gear shift shock, and when time $t=t_4$, the moving direction of the vehicle changes from reverse to forward.

In the transmission of this type which selectively functions as an output-split type HMT or as an input-split type HMT, when shifting the transmission from reverse to forward for instance, the following control method is usually taken: After turning the brake mechanism 36 for the second pump/motor 15 ON, the clutch mechanism 6 is switched from the output-split side to the input-split side within a mechanical direct-coupling zone where power transmission from the input shaft 3 to the intermediate output shaft 8 is carried out by the planetary gear train 9 alone. Subsequently, the brake mechanism 36 is turned OFF and the volume ratio of the first pump/motor 7 is changed in the input-split zone. Then, the F/R shifting clutch mechanism 40 is switched. In the switching operation of the F/R shifting clutch mechanism 40, engagement of the forward hydraulic clutch is carried out with modulation that includes the time period during which the vehicle speed is zero ($t=t_4$ in FIG. 4). However, this control method has such a disadvantage that the gear shift control needs (1) the time required for turning the brake mechanism 36 ON; (2) the time required for decreasing the speed ratio within the output-split zone; (3) the time required for decreasing the speed ratio within the input-split zone; and (4) the time required for turning the brake mechanism 36 OFF. Another disadvantage of this control method is that the load imposed on the F/R shifting clutch mechanism 40 increases significantly. The reason for this is that, at the time of engagement of the forward hydraulic clutch, a load caused by the inertia of the vehicle body is imposed on the forward hydraulic clutch when the transmission is in reverse and a load of the engine is imposed on the same when the transmission is in forward.

In contrast with the above method, the control method of the present embodiment can save the time required for the gear shift control, because when disengaging the reverse hydraulic clutch 27 while engaging the forward hydraulic clutch 30, the relief set pressure of the variable relief valve 38 is decreased to the vicinity of zero to drain pressure oil from the hydraulic piping 21, so that switching of the F/R shifting clutch mechanism 40 and switching of the clutch mechanism 6 from the output-split side to the input-split side are carried out while changing the volume ratio of the first pump/motor 7. In addition, in response to switching of the F/R shifting clutch mechanism 40, the first pump/motor 7 is shifted from the input shaft 3 side to the intermediate output shaft 8 side, so that even if the vehicle speed before the gear shifting operation is high, it is possible to smoothly switch from the output-split function to the input-split function.

Further, gear shifting is accomplished only by the hydraulic control of the hydraulic piping 21 for connecting the first pump/motor 7 to the second pump/motor 15 and the set pressure of the variable relief valve 38 is decreased to the vicinity of zero thereby substantially freeing the fourth gear 14 of the planetary gear train 9. By virtue of this, gear shifting without slippage of the forward hydraulic clutch 30 (or the reverse hydraulic clutch 27) is enabled. As a result, the loads imposed on the forward hydraulic clutch 30 (or the reverse hydraulic clutch 27) can be reduced and, therefore, the capacity of the clutches can be reduced.

It should be noted that the controller 43 of the present embodiment corresponds to the variable relief valve controlling means, coupling/decoupling controlling means and brake mechanism controlling means of the invention.

While the invention has been presented with a case where the transmission is shifted from reverse to forward in the foregoing embodiment, it is apparent that the same control can be performed in gear shifting from forward to reverse.

Although engine control during gear shifting between forward and reverse has not been described in the foregoing embodiment, it may be carried out in combination with the F/R gear shift control, whereby not only the time required for gear shifting can be saved by use of engine brake, but also a gear shift shock can be mitigated by fuel injection amount control.

While a preferred embodiment of the present invention has been described, other variations and modifications will be apparent to those skilled in the art from a consideration of the disclosure, drawings and claims of the invention. However, it is to be understood that the appended claims shall be construed to include all such modifications, objects and effects as fall within the technical concept and scope of the invention.

What is claimed is:

1. A control system for a hydro-mechanical transmission, the hydro-mechanical transmission having (a) an input shaft, (b) an output shaft, (c) a mechanical transmission unit including a planetary gear train interposed between the input shaft and the output shaft, (d) a hydrostatic transmission unit including a first pump/motor, a second pump/motor and a hydraulic piping for connecting the first and second pump/motors, (e) a coupling/decoupling clutch mechanism for selectively coupling the first pump/motor to either the input shaft or the output shaft, and (f) a forward/reverse shifting clutch mechanism disposed at one end of the output shaft, and said hydro-mechanical transmission being formed such that the input shaft is coupled to a first element of the planetary gear train; the second pump/motor is coupled to a second element of the planetary gear train; and the output shaft is coupled to a third element of the planetary gear train, the control system comprising: (a) a variable relief valve inserted in the hydraulic piping for connecting the first pump/motor to the second pump/motor and (b) a variable relief valve controlling means for controlling the variable relief valve such that a relief set pressure of the variable relief valve is reduced in response to switching of the forward/reverse shifting clutch mechanism when shifting the transmission from forward to reverse or vice versa and such that the relief set pressure is increased after completion of the switching of the forward/reverse shifting clutch mechanism.

2. The control system for a hydro-mechanical transmission according to claim 1, further comprising coupling/decoupling controlling means for controlling the coupling/decoupling clutch mechanism so as to decouple the first pump/motor from the input shaft and couple it to the output shaft in response to switching of the forward/reverse shifting clutch mechanism.

3. The control system for a hydro-mechanical transmission according to claim 1, wherein the variable relief valve controlling means controls the relief set pressure so as to gradually increase after completion of switching of the forward/reverse shifting clutch mechanism.

4. The control system for a hydro-mechanical transmission according to claim 3, further comprising coupling/decoupling controlling means for controlling the coupling/decoupling clutch mechanism so as to decouple the first pump/motor from the input shaft and couple it to the output shaft in response to switching of the forward/reverse shifting clutch mechanism.

5. The control system for a hydro-mechanical transmission according to claim 1, further comprising brake mechanism controlling means for actuating a brake mechanism for braking the shaft of the second pump/motor in response to switching of the forward/reverse shifting clutch mechanism.

6. The control system for a hydro-mechanical transmission according to claim 2, further comprising brake mechanism controlling means for actuating a brake mechanism for braking the shaft of the second pump/motor in response to switching of the forward/reverse shifting clutch mechanism.

7. The control system for a hydro-mechanical transmission according to claim 3, further comprising brake mechanism controlling means for actuating a brake mechanism for braking the shaft of the second pump/motor in response to switching of the forward/reverse shifting clutch mechanism.

8. The control system for a hydro-mechanical transmission according to claim 4, further comprising brake mechanism controlling means for actuating a brake mechanism for braking the shaft of the second pump/motor in response to switching of the forward/reverse shifting clutch mechanism.

* * * * *